United States Patent [19]

Muckenhirn

[11] Patent Number: 4,883,350
[45] Date of Patent: Nov. 28, 1989

[54] CONTACT LENS PROVIDING A CENTRAL SPHERICAL REGION BOUNDED BY A CIRCUMSCRIBING ASPHERICAL REGION

[76] Inventor: Dieter Muckenhirn, Dorfstrasse 2, D-7801 Au, Fed. Rep. of Germany

[21] Appl. No.: 2,714
[22] PCT Filed: May 7, 1986
[86] PCT No.: PCT/EP86/00269
§ 371 Date: Dec. 30, 1986
§ 102(e) Date: Dec. 30, 1986
[87] PCT Pub. No.: WO86/06848
PCT Pub. Date: Nov. 20, 1986

[30] Foreign Application Priority Data
May 8, 1985 [DE] Fed. Rep. of Germany ....... 3516575

[51] Int. Cl.[4] .............................................. G02C 7/04
[52] U.S. Cl. ................................................ 351/160 R
[58] Field of Search ............... 351/160 R, 160 H, 161, 351/162

[56] References Cited

U.S. PATENT DOCUMENTS 4,418,991 12/1983 Breger ................................. 351/161
4,525,043 6/1985 Bronstein ........................ 351/160 R
4,640,595 2/1987 Volk ................................. 351/160 R

FOREIGN PATENT DOCUMENTS 2938957 9/1979 Fed. Rep. of Germany .
3002664 1/1980 Fed. Rep. of Germany .
3031749 8/1980 Fed. Rep. of Germany .
3137068 9/1981 Fed. Rep. of Germany .
2386835 11/1978 France .
2463425 2/1981 France .
2499256 8/1982 France .
2132785 7/1984 United Kingdom .
2139375 11/1984 United Kingdom .

Primary Examiner—Scott J. Sugarman
Attorney, Agent, or Firm—Brown Brown; Robert T. Gammons

[57] ABSTRACT

Contact lens (1) comprising a rear contact surface (2) presenting a spherical region described by an arc of a circle passing by the vertex (S). In order to improve the optical properties while improving the adaptability and compatibility, the contact lens (1) presents an aspherical region adjacent to the spherical region; the curve representing the aspherical region and the arc of a circle representing the spherical region have in the transition a substantially equal curvature radius ($R_o$) and a substantially equal slope.

26 Claims, 1 Drawing Sheet

FIG. I
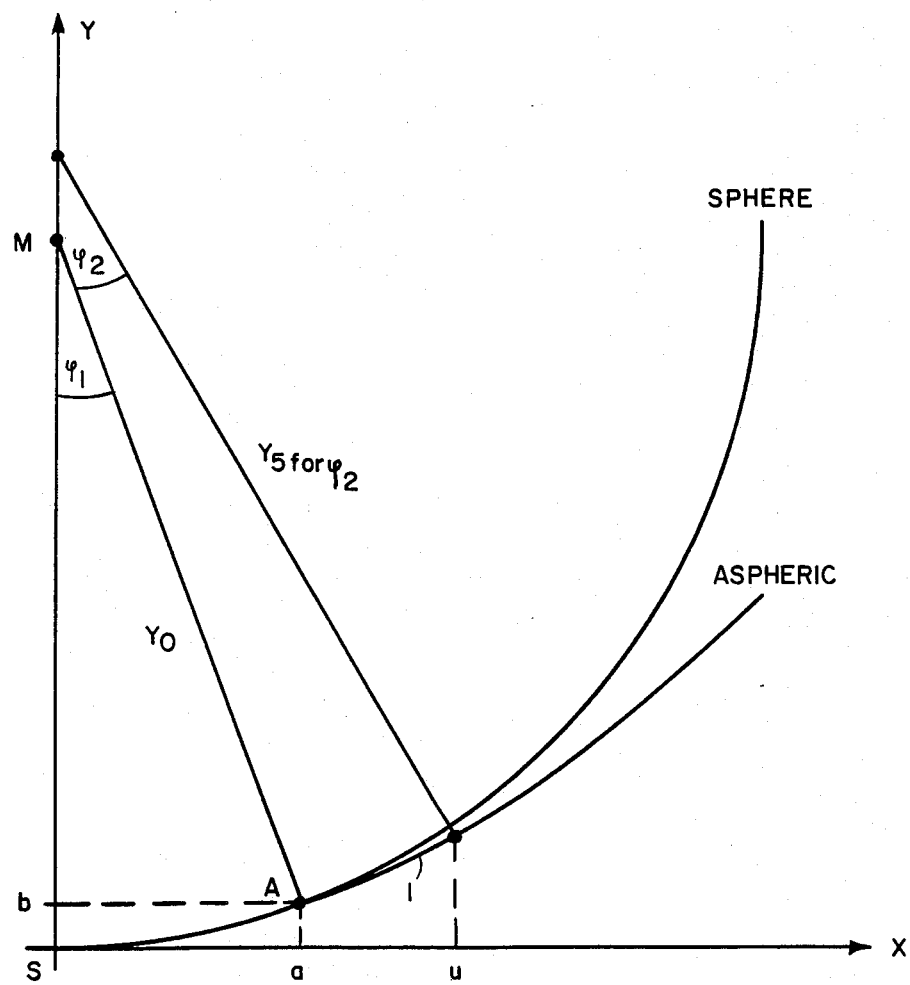
FIG. 2

CONTACT LENS PROVIDING A CENTRAL SPHERICAL REGION BOUNDED BY A CIRCUMSCRIBING ASPHERICAL REGION

FIELD OF THE INVENTION

The present invention relates to a contact lens comprising a rear surface presenting a spherical region described by an arc passsing through the vertex.

DESCRIPTION OF THE PRIOR ART

Such a known contact lens comprises a spherical rear surface having a diameter of approximately 7 to 9 mm, and a marginal zone adjacent thereto. This type of lens offers the advantage of a large optical zone. The seating of this lens is less favorable as the cornea has an aspherical surface. Furthermore, contact lenses with an elliptical rear surface are known. These lenses have a better seating than lenses with a spherical rear surface. Finally, contact lenses are known with a plurality of mutually adjacent optical zones. At each boundary between respectively neighboring optical zones a kink or bend occurs which leads to reflexes and imaging disturbances.

SUMMARY OF THE INVENTION

It is the object of the invention to provide a contact lens of the above-described type, which comprises a central spherical region and an aspherical region adjacent thereto, which has particularly good compatibility and adaptability properties.

This object is achieved with a contact lens of the type described by way of introduction, which according to the invention is characterized by the fact that an aspherical region, which can be represented by a curve, is adjacent to the spherical region, said curve and said arc having a substantially equal radius of curvature and a substantially equal gradient in the area of transition. This design achieves that no step occurs at the boundary between the spherical and the aspherical region.

Due to the small spherical central region, the contact lens is given imaging properties which are comparable to those achieved with purely spherical rear surfaces. Especially with an offset lens seating or with the movement of a lens after a palpebral twitch this fact becomes apparent by a stable acuity of vision. With a cornea which strongly flattens in its periphery, e.g. in the event of keratoconus, an optimum acuity of vision can be achieved as well with such a lens design, which is not possible with other aspherical rear surfaces such as ellipsoids or paraboloids with a high eccentricity. Furthermore, it is possible to vary the vertex curvature radius of the spherical region and the eccentricity separately from one another so that a better adaptation to the individual corneal shape will be possible. This results in its turn in a better exchange of tear fluid and good spontaneous and long-term compatibility.

Further features and expedient aspects of the invention will proceed from the description of an embodiment with reference to the figures.

BRIEF DESCRIPTION OF THE DRAWINGS

In the drawing:
FIG. 1 is a section through a contact lens; and
FIG. 2 shows a curve representing the rear surface of the contact lens, beginning from the vertex thereof.

DESCRIPTION OF THE PREFERRED EMBODIMENTS

The rear surface 2 is defined by a curve 1 in a XY coordinate system. The rear surface of the contact lens is achieved by the rotation of this curve 1 about the y-axis. The coordinates of the vertex S of the curve are $x=0$, $y=0$. $x=0$, $y=r_o$ applies to the center of curvature M. The following quantities are defined at any point P (X/Y) of curve 1:

$\alpha$ is the angle which the normal encloses with the y-axis at point P. $\alpha$ is thus the gradient angle of the tangent at pint P.

$y'$ is the tangent gradient $\tan \alpha$.

The sagittal radius $r_s$ = length of the normal from point P onto the y-axis.

$\epsilon$ is the linear eccentricity defined by the equation:

$$\epsilon = \sqrt{\frac{r_s^2 - r_o^2}{x^2}} = \sqrt{\frac{1}{\sin^2\alpha} - \frac{r_o^2}{x^2}}$$

Within the angular area $\alpha_1$ the surface is an exact sphere with $r_s = r_o$ and $\epsilon = 0$. $\alpha_1$ ranges between 10° and 20°, and preferably at 15° approximately. The curve of the arc in the area from the vertex to the point of transition A, with $x=a$ and $y=b$, is governed by the following relationship:

$$a = r_o \times \sin \alpha_1$$

$$b = r_o(1 - \cos \alpha_1)$$

$$y = r_o - \sqrt{r_o^2 - x^2} \text{ for } 0 \leq x \leq a$$

At point A, the curve changes into the spherical curve. This curve can be described by a power series of the third degree, in the form of $$y = c_0 + c_1(x-a) + c_2(x-a)^2 + c_3(x-a)^3 \text{ for } x \geq = a$$

In this relationship, the power series of the sphere is in congruence with the gradient and the radius of curvature at point A, which means that $\epsilon = 0$. With an angle $\alpha_2$ the eccentricity reaches the value $\epsilon_k$. The constants $c_0$ through $c_3$ are governed by the following relationships:

$$c_0 = r_o(1 - \cos \alpha_1)$$

$$c_1 = \tan \alpha_1$$

$$c_2 = \frac{(1 + \tan^2\alpha_1)^{1.5}}{2r_o}$$

$$U = \frac{r_o \times \sin \alpha_2}{\sqrt{1 - \epsilon_k^2 \sin^2\alpha_2}}$$

$$c_3 = \frac{\tan\alpha_2 - \tan\alpha_1 - 2c_2 \times (u - a)}{3(u - a)^2}$$

A preferred embodiment will be given below, wherein $r_o = 8$ mm, $\alpha_1 = 14°$, $\alpha_2 = 30°$ and $\epsilon_k = 0.6$.

In this embodiment applies:

$$a = 1.9354$$
$$c_0 = 0.23763 \quad c_1 = 0.249328$$
$$c_2 = 0.0684175 \quad u = 4.1931393$$
$$c_3 = 0.00124772$$

Hence:

$$y = 8 - \sqrt{64 - x^2} \quad \text{for } x \leq 1.9354$$
$$\text{and} \quad \text{for } x \geq = 1.9354$$
$$y = 0.23763 + 0.249328(x-a) + 0.068175(x-a)^2 + 0.00124772(x-a)^3.$$

I claim:

1. A contact lens comprising a rear surface presenting a central spherical region described by an arc passing through the vertex, characterized in that said central spherical region is circumscribed by an aspherical region defined by a curve adjacent the spherical region, said curve and said arc having a substantially equal radius of curvature and a substantially equal gradient in the area of transition and further characterized in that the arc extends up to an angle in the range of 10° to 20° measured from the center of curvature.

2. A contact lens comprising a rear surface defining a central spherical region described by an arc passing through the vertex and an aspherical region circumscribing said central spherical region defined by a curve adjacent the spherical region, said arc and said curve having substantially equal radius of curvature and a substantially equal gradient in the area of transition from one to the other, characterized in that the arc extends up to an angle in the region of from 10° to 20° measured from the center of curvature.

3. A contact lens according to claim 2 characterized in that the arc extends up to an angle in the order of 15°.

4. A contact lens according to claim 2 characterized in that the eccentricity of the arc is in the range of 0.3 to 1 at an angle of $\alpha = 30°$.

5. A contact lens according to claim 3 characterized in that the eccentricity of the arc is in the range of 0.3 to 1 at an angle of $\alpha = 30°$.

6. A contact lens according to claim 4 characterized in that the eccentricity of the curve is approximately 0.6.

7. A contact lens according to claim 5 characterized in that the eccentricity of the curve is approximately 0.6.

8. A contact lens according to claim 2 characterized in that the radius of the arc of a spherical area which passes through the vertex is in the order of 6 to 9 millimeters.

9. A contact lens according to claim 3 characterized in that the radius of the arc of the spherical area which passes through the vertex is in the order of 6 to 9 millimeters.

10. A contact lens according to claim 4 characterized in that the radius of the arc of the spherical area which passes through the vertex is in the order of 6 to 9 millimeters.

11. A contact lens according to claim 5 characterized in that the radius of the arc of the spherical area which passes through the vertex is in the order of 6 to 9 millimeters.

12. A contact lens comprising a rear surface defining a central spherical region described by an arc passing through the vertex and an aspherical region circumscribing said central spherical region defined by a curve adjacent the spherical region, said arc and said curve having substantially equal radius of curvature and a substantially equal gradient in the area of transition from one to the other, characterized in that said curve corresponds to a power series of the third degree and that the arc extends up to an angle in the range of from 10° to 20° measured from the center of curvature.

13. A contact lens according to claim 12 characterized in that the arc extends up to an angle in the order of 15°.

14. A contact lens according to claim 3, 6 or 12 characterized in that the eccentricity of the arc is in the range of 0.3 to 1 at an angle of $\alpha = 30°$.

15. A contact lens according to claim 13 characterized in that the eccentricity of the arc is in the range of 0.3 to 1 at an angle of $\alpha = 30°$.

16. A contact lens according to claim 14 characterized in that the eccentricity of the curve is approximately 0.6.

17. A contact lens according to claim 15 characterized in that the eccentricity of the curve is approximately 0.6.

18. A contact lens according to claim 12 characterized in that the radius of the arc of a spherical area which passes through the vertex is in the order of 6 to 9 millimeters.

19. A contact lens according to claim 13 characterized in that the radius of the arc of the spherical area which passes through the vertex is in the order of 6 to 9 millimeters.

20. A contact lens according to claim 14 characterized in that the radius of the arc of the spherical area which passes through the vertex is in the order of 6 to 9 millimeters.

21. A contact lens according to claim 15 characterized in that the radius of the arc of the spherical area which passes through the vertex is in the order of 6 to 9 millimeters.

22. A contact lens comprising a rear surface defining a central spherical region described by an arc passing through the vertex and an aspherical region circumscribing said central spherical region defined by a curve adjacent the spherical region, said arc and said curve being of substantially equal radius of curvature and substantially equal gradient in the area of transition from one to the other and further characterized in that the curve corresponds to a power series of the third degree and that the eccentricity of the curve is in the range of from 0.3 to 1 at an angle of $\alpha = 30°$.

23. A contact lens according to claim 22 characterized in that the eccentricity of the curve is approximately 0.6.

24. A contact lens according to claim 22 characterized in that the radius of the arc of the spherical area which passes through the vertex is in the order of 6 to 9 millimeters.

25. A contact lens comprising a rear surface defining a central spherical region described by an arc passing through the vertex and an aspherical region circumscribing said central spherical region defined by a curve adjacent the spherical region, said arc and said curve having substantially equal radius of curvature and substantially equal gradient in the area of transition from one to the other, characterized in that the radius of the arc of the spherical area which passes through the vertex is in order of 6 to 9 millimeters.

26. A contact lens comprising a rear surface defining a central spherical region described by an arc passing through the vertex and an aspherical region circumscribing said central spherical region defined by a curve adjacent the spherical region, said arc and said curve having substantially equal radius of curvature and substantially equal gradient in the area of transition from one to the other, characterized in that said curve corresponds to a series of the third degree and further characterized in that the arc of the spherical area which passes through the vertex is in the order of 6 to 9 millimeters.

* * * * *